United States Patent [19]

Sugimoto et al.

[11] 4,324,153

[45] Apr. 13, 1982

[54] METHOD FOR DRIVER-DEPENDENT SHIFT CONTROL OF A VEHICLE SUB-TRANSMISSION WHICH MAXIMIZES FUEL ECONOMY

[75] Inventors: Hiroshi Sugimoto, Aichi; Jiro Nakano, Okazaki; Noritaka Yanagihara, Toyota, all of Japan

[73] Assignee: Toyota Jidosha Kogyo Kabushiki Kaisha, Toyota, Japan

[21] Appl. No.: 60,129

[22] Filed: Jul. 24, 1979

[30] Foreign Application Priority Data

Dec. 4, 1978 [JP] Japan ............................. 53-150348

[51] Int. Cl.³ ..................... B60K 41/06; B60K 41/10
[52] U.S. Cl. ........................................ 74/866; 74/861; 74/863; 74/864
[58] Field of Search .............. 74/843, 866, 861, 863, 74/864, 862, 856, 740, 752/D, DIG. 6

[56] References Cited

U.S. PATENT DOCUMENTS

| 2,637,222 | 5/1953 | Backus | 74/745 |
| 2,654,268 | 10/1953 | Perkins | 74/745 |
| 2,763,290 | 9/1956 | Perkins et al. | 74/745 X |
| 3,695,122 | 10/1972 | Irie et al. | 74/864 |
| 3,710,651 | 1/1973 | Marumo et al. | 74/864 |
| 3,726,159 | 4/1973 | Mizote | 74/752 D |
| 3,759,344 | 9/1973 | Blee et al. | 74/864 |
| 3,827,315 | 8/1974 | Lupo | 74/863 |
| 3,939,722 | 2/1976 | Stromberg | 74/861 X |
| 3,942,393 | 3/1976 | Forster et al. | 74/866 |
| 3,943,799 | 3/1976 | Sakai et al. | 74/866 |
| 4,102,222 | 7/1978 | Miller et al. | 74/866 |
| 4,172,505 | 10/1979 | Rabus | 74/862 X |

FOREIGN PATENT DOCUMENTS

| 2625770 | 12/1977 | Fed. Rep. of Germany | 74/861 |
| 2948227 | 6/1978 | Fed. Rep. of Germany | 74/863 |
| 2813679 | 10/1978 | Fed. Rep. of Germany | 74/866 |

Primary Examiner—Leslie Braun
Attorney, Agent, or Firm—Finnegan, Henderson, Farabow, Garrett & Dunner

[57] ABSTRACT

A method is disclosed for automatically shifting the sub-transmission of a vehicle which is also equipped with a manual transmission operated by hand by the driver. When the driver shifts by hand to a certain gearing ratio, a vehicle operating parameter is detected, and, on the basis of this detected value, the procedure for shifting the sub-transmission is modified. Shift control of the sub-transmission is performed in accordance with this modified sub-transmission shift procedure, for a first time period, while the manual transmission remains in this gearing ratio, and subsequently for a second time period shift control of the sub-transmission is performed so as to maximize fuel economy, while the manual transmission remains in this gearing ratio.

8 Claims, 8 Drawing Figures

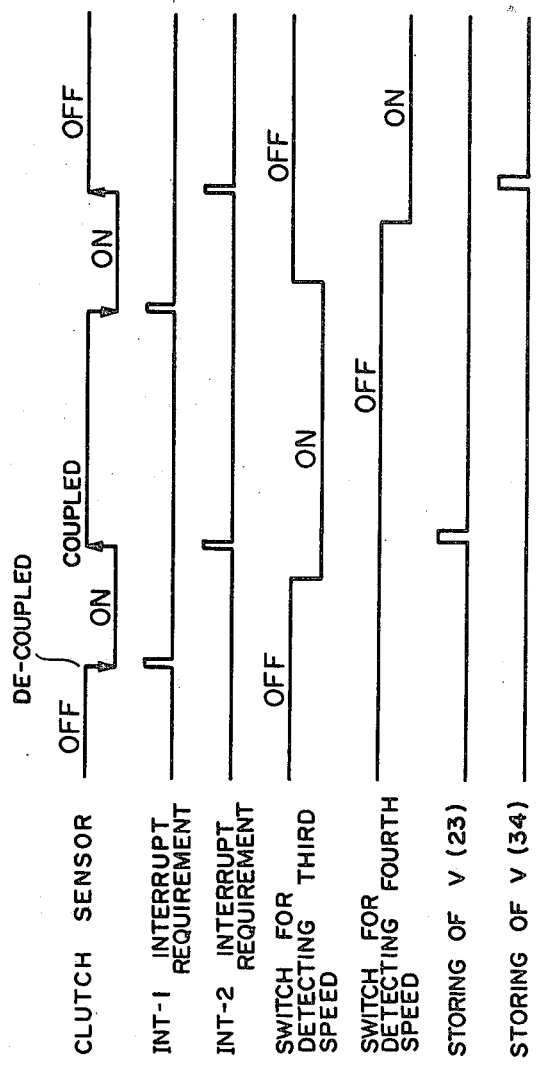

METHOD FOR DRIVER-DEPENDENT SHIFT CONTROL OF A VEHICLE SUB-TRANSMISSION WHICH MAXIMIZES FUEL ECONOMY

BACKGROUND OF THE INVENTION

The present invention relates to a shift control method for a sub-transmission incorporated into the power transmission system of a vehicle such as an automobile, and more particularly relates to a shift control method for performing properly the shifting of such a sub-transmission in accordance with the operating conditions of the vehicle, bearing in mind the style of driving and of gear shifting of the driver.

It is known to incorporate a two-speed sub-transmission, which can be shifted between a high speed stage and a low speed stage, into the power train of a vehicle such as an automobile which also is equipped with a manual transmission.

The control of such a sub-transmission has sometimes been manual; however, this puts a strain on the driver, and distracts him unduly from the business of vehicle control. As a result, such manual control has not been practical from the point of view of obtaining the proper shift timing of the sub-transmission to ensure good performance and fuel economy.

In order to avoid this problem, it has been proposed to control such a sub-transmission electrically or electronically, by shifting it over from the low speed stage to the high speed stage, and from the high speed stage to the low speed stage, automatically, depending upon combinations of various vehicle and/or engine operating parameters, such as the vehicle speed, the engine revolution speed, the throttle opening, the engine load, etc. Typically, the shifting is performed in accordance with a transmission diagram, which is a line on a graph of a signal representing either vehicle speed or engine speed, against a signal representing engine load, such as the throttle opening.

Now, the shifting of the manual transmission is performed by the driver, according to his own free will, and the precise shift points will vary according to the driver's habits, the conditions of the road, and so on. If, therefore, the transmission diagram of the sub-transmission is determined independently of these conditions, and shifting of the sub-transmission is performed in accordance therewith, it may occur that this shifting is performed at times which rather go against the wish of the driver, as expressed by his particular current pattern of gear shifting.

For instance, if the driver currently does not perform upshifting until the speed of the vehicle has become relatively high, so that he is performing so-called high-revving or high acceleration operation, it is desirable that the sub-transmission, responding to this mode of operation, likewise should not shift from its low speed stage to its high speed stage until the vehicle speed has become relatively high. Thus the driving style of the driver and the sub-transmission will blend harmoniously.

If, on the other hand, the sub-transmission does not respond to this high-revving mode of operation by the driver, then the shift of the sub-transmission from its low speed stage to its high speed stage may occur almost immediately after the manual upshift by the driver, so that, in effect, high-revving operation is not performed, and the driver's intentions are frustrated.

Similarly if, on the other hand, the driver is currently in the habit of performing upshifting rather early, so that the vehicle is being operated in a low-revving or sedate mode, (which provides good fuel economy), then, again, if the automatic control of the sub-transmission does not respond to this mode of manual shifting, a rather long time will elapse after upshifting by the driver before the sub-transmission shifts from its low speed stage to its high speed stage, and thus low-revving operation of the vehicle will not take place, and again the driver's intentions will be frustrated.

Therefore, in a co-pending patent application Ser. No. 060,003, it has been proposed to perform the control of a sub-transmission of a vehicle which is fitted with a manual transmission in a manner which depends upon the style of driving of the vehicle operator.

However, there is a point in this proposed method of sub-transmission shift control which induces a further development of this basic concept of sub-transmission shift control. If the driver of the vehicle performs a change to a certain transmission ratio, and thereafter operates the vehicle for a considerable time in that ratio, as for example during open road driving, the operation of the sub-transmission will be determined for a very considerable time on the somewhat fortuitous basis of the exact speed at which gear shifting to that ratio was last made. This is not generally logical, and furthermore may well not be what the driver desires.

From the point of view of fuel economy, the transmission ratio being fixed, there is an optimum line on a chart of engine rotational speed versus torque for operating a vehicle. If the engine is operated along that line, maximum fuel economy will result. In order to operate the engine as close along that line as possible, under the given conditions of the vehicle speed and the required output power, the engine rotational speed may be controlled more desirably by shifting the sub-transmission of the vehicle. Of course, the engine cannot thereby be operated exactly along that line, but an approximation can be made thereto. Therefore, from the point of view of maximizing fuel economy, there is an optimum manner of operating the sub-transmission.

It has occurred to the present inventors that it would be ideal to perform the first, or operator-sensitive, sub-transmission control, until a steady vehicle operation commences, and thereafter to perform the second, or fuel-economical, sub-transmission control.

SUMMARY OF THE INVENTION

Therefore, it is an object of the present invention to provide a shift control method for the sub-transmission of a vehicle which will perform the shift of the sub-transmission so as to continue and complement the method and style of engine operation desired by the driver and implemented by him via a manually shifted transmission, during a first time period after shifting to a particular gearing ratio, and which thereafter will perform the shift of the sub-transmission so as to maximize fuel economy.

According to the present invention, this object is achieved by a shift control method for a sub-transmission of a vehicle which is also equipped with a manual transmission operated by hand by the driver, comprising the steps, in order, of detecting the driver's shifting of the manual transmission at a certain gearing ratio, measuring a vehicle operating parameter at a driver-determined shift time of the manual transmission to a certain gearing ratio; determining a sub-transmission shift procedure which relates to said gearing ratio of the manual transmission, on the basis of said detected value; performing for a first time period shift control of the sub-transmission in accordance with said driver-determined sub-transmission shift procedure, while the manual transmission is set to said gearing ratio; and subsequently performing for a second time period which directly follows the first time period shift control of the sub-transmission in accordance with a shift procedure which provides substantially optimum fuel economy, while the manual transmission is set to said gearing ratio.

BRIEF DESCRIPTION OF THE DRAWINGS

The present invention will become more fully understood by reference to the following description of a preferred embodiment, and to the accompanying drawings. It should be clearly understood, however, that the present invention is not intended to be limited in any way by any features of the shown embodiment, or of the drawings, which are all given by way of illustration and exemplification only. In the drawings:

FIG. 8 is a control time chart of the operation of the computer.

DESCRIPTION OF THE PREFERRED EMBODIMENT

Figure 1:
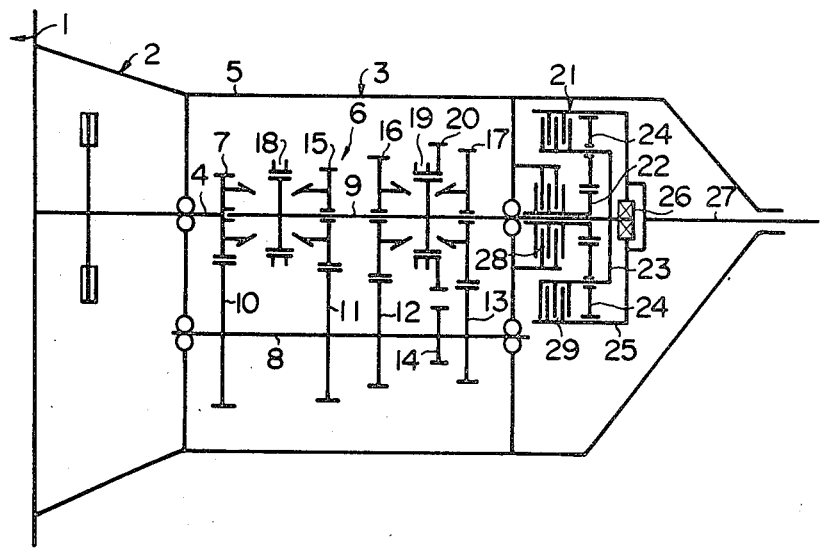
FIG. 1 is a skeleton diagram showing an example of a manual transmission with a sub-transmission, as used in a vehicle, and as controlled according to the method of the present invention.

FIG. 1 shows, in diagrammatic form, part of the transmission system of a vehicle which is equipped with a control system which practices the method of the present invention. Reference numeral 1 denotes the rear part of the engine of the vehicle, and the rotary power generated by this engine is transmitted, via a clutch apparatus 2, to an input shaft 4 of a manual transmission 3. This transmission 3 is of a conventional type. It includes in its case 5 a synchronous interlocking type main transmission apparatus 6 with four forward speed stages and one reverse speed stage, and it further includes an epicyclic gearing type sub-transmission 21 with two shift stages.

The input shaft 4 is supported rotatably in the case 5. Its one end has a gear 7 fixed thereto. The case 5 further supports rotatably a counter shaft 8, under said input shaft 4 in the drawing, and a drive shaft 9 on the same axis as that of said input shaft 4. The counter shaft 8 has five counter gears 10, 11, 12, 13, and 14 as one unit, and these gears all have different numbers of teeth. The counter gear 10 engages the gear 7 at all times, thereby transmitting rotary power from said input shaft 4 to said counter shaft 8. Said drive shaft 9 carries rotatably a third speed gear 15, a second speed gear 16, and a first speed gear 17, said third speed gear 15 engaging said counter gear 11, said second speed gear 16 engaging said counter gear 12, and said first speed gear 17 engaging said counter gear 13 at all times, so that the rotary power is transmitted from said counter shaft 8 to said three speed gears at all times.

Between said gear 7 and said third speed gear 15 a synchronizer 18 between third speed and fourth speed is provided, and between said second speed gear 16 and said first speed gear 17 a synchronizer 19 between first speed and second speed is provided. These synchronizers may be of a well known type, such as the Borg-Warner type. When the hub sleeve of said synchronizer 18 between third speed and fourth speed is shifted leftward in the figure, said drive shaft 9 is coupled with said input shaft 4, and fourth speed is provided, while, when the hub sleeve of said synchronizer 18 between third speed and fourth speed is shifted rightwards in the figure, said drive shaft 9 is coupled with said third speed gear 15 and third speed is provided. Further, when the hub sleeve of said synchronizer 19 between first speed and second speed is shifted to the left in the figure, said drive shaft 9 is coupled with said second speed gear 16, and second speed is provided, while, when the hub sleeve of said synchronizer 19 between first speed and second speed is shifted rightwards in the figure, said drive shaft 9 is coupled with said first speed gear 17, and first speed is provided.

Said synchronizer 19 between first speed and second speed has a reverse gear 20 in its hub sleeve. A reverse idler gear, not shown in the drawing, engages with this reverse gear 20 and said counter gear 14 selectively. When this engagement is performed, reverse speed stage is provided.

The shifting of said synchronizers 18, 19, and the reverse idler gear is performed by a manual shift lever not shown in the drawing in a manner which is per se well known.

The sub-transmission apparatus 21 has a sun gear 22 carried rotatably on said drive shaft 9; a plurality of planetary pinions 24 carried rotatably on the planetary carrier 23, which is coupled with said drive shaft 9 fixedly, and engages said sun gear 22; and a ring gear 25 engaging said planetary pinions. Said ring gear 25 is coupled with said drive shaft 9 by way of a one-way clutch 26, and is coupled fixedly with one end of the output shaft 27.

This one-way clutch 26 is adapted to engage together said drive shaft 9 and said ring gear 25, when the rotating speed of said drive shaft 9 reaches that of said ring gear 25. Further, the sub-transmission apparatus 21 includes a brake apparatus 28 which fixes said sun gear 22 selectively to the casing 5, and a clutch apparatus 29 which couples said planetary carrier 23 selectively to said ring gear 25, said brake apparatus 28 and said clutch apparatus 29 being operated by solenoid apparatuses 30 and 31 (not shown in FIG. 1, but schematically shown in FIG. 2), respectively.

Thus, it is seen that when the solenoid apparatus 30 for operating the brake 28 is energized, and the solenoid apparatus 31 for operating the clutch 29 is not energized, said brake apparatus 28 is operated, and said clutch apparatus 29 is not operated, whereby said sun gear 22 is fixed. Therefore, the rotary power of the drive shaft 9 is transmitted from the planetary carrier 23 to the output shaft 27 at a revolution speed which is increased by the operation of the planetary pinion 24 and the ring gear 25. On the other hand, when the solenoid apparatus 30 for the brake 28 is not energized, and the solenoid apparatus 31 for the clutch 29 is energized, said brake apparatus 28 is not operated, but said clutch 29 is operated, whereby said planetary carrier 23 is coupled with said ring gear 25, so that the sub-transmission apparatus 21 is in the direct coupled state. Thus the rotary power of the drive shaft 9 is transmitted to the output shaft 27 without changing of revolution speed.

Figure 2:
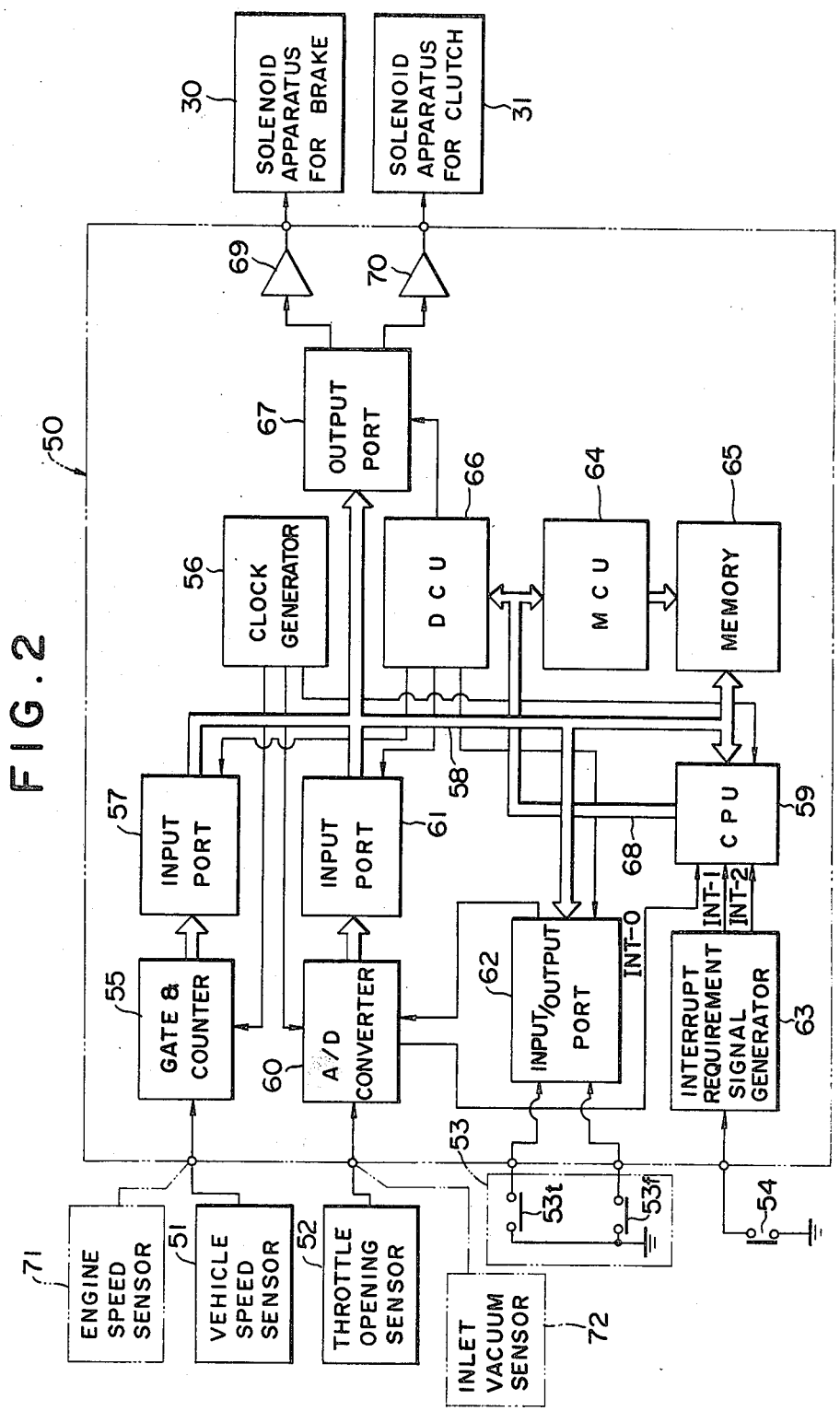
FIG. 2 is a block diagram, showing a shift control apparatus which practices a method which is an embodiment of the present invention.

FIG. 2 is a block diagram of an apparatus which performs an embodiment of the method of the present invention for shift control of the sub-transmission apparatus 21. This shift control apparatus has a computer 50 which receives signals generated by a vehicle speed sensor 51, a throttle opening sensor 52, a shift position sensor 53, and a clutch sensor 54, and which performs the energization and de-energization of said solenoid apparatuses 30 and 31 according to these signals.

The vehicle speed sensor 51 includes a magnet rotor rotating at a speed proportional to the vehicle speed, and a reed switch, not shown in the drawing, and generates a pulse signal. This signal is given to a gate counter circuit 55 as a gate signal. This gate counter circuit 55 also receives a clock signal from a clock signal generator circuit 56, counts clock pulses during one cycle of said gate signal, and gives the counted result to a central processing unit (CPU) 59, through an input port 57 and a bidirectional common bus 58 at a predetermined time. The throttle opening sensor 52 comprises a variable register, which responds to the opening of the throttle valve provided in the inlet system, which is not shown, of the engine 1, and generates an analog signal, which in this embodiment is a voltage signal, and which varies in accordance with the degree of opening of the throttle. This analog signal is fed to an A/D converter 60. This A/D converter also receives the clock signal from the clock pulse generator 56, and converts said analog signal to a digital signal in accordance therewith. This digital signal is then fed to the CPU 59, through an input port 61 and the common bus 58, at a predetermined time.

The shift position sensor 53 includes a switch for detecting the engagement of third speed, 53t, which gives a "0" signal to an input/output port 62 only when the manual transmission is in third speed, and a switch for detecting the engagement of fourth speed, 53f, which gives a "0" signal to the said input/output port 62 only when the manual transmission is in fourth speed. The signal given from said shift position sensor 53 to said input/output port 62 is introduced to said CPU 59 through said common bus 58 at a predetermined time.

The CPU 59 further receives the clock signal from the clock signal generator 56. The CPU 59 gives a conversion start signal to the A/D converter 60 through the common bus 58 and the input/output port 62, and receives a conversion end signal (EOC signal) from the A/D converter as an interrupt requirement signal for INT-0.

The clutch sensor 54 comprises an electrical switch, which gives a "0" signal to an interrupt requirement signal generator 63 while the clutch apparatus 2 is decoupled. The interrupt requirement signal generator 63 gives an interrupt requirement signal for the below-mentioned routine INT-1 to the CPU 59 when the signal output from said clutch sensor 54 changes from a "1" signal to a "0" signal, and gives an interrupt requirement signal for the below-mentioned routine INT-2 to said CPU 59 when the signal given from said clutch sensor 54 changes from a "0" signal to a "1" signal.

The CPU 59 may be a per se well known processor, which includes a general register, an arithmetic circuit, a program counter, etc., and which gives a control instruction signal to a memory control unit (MCU) 64, which controls a memory apparatus 65, and to a device control unit (DCU) 66, which controls said input ports 57 and 61, said input/output port 62, and said output port 67, through a control bus 68.

The memory apparatus 65 is connected to said CPU 59 through the bidirectional common bus 58. This memory apparatus 65 includes a read-only memory (ROM) and a random access memory (RAM). The ROM stores the program for computer routines and various coefficients for arithmetic operation, and the RAM stores temporarily the signals generated by said vehicle sensor 51, throttle opening sensor 52, and shift position sensor 53, the other output signals, the signal for temporarily evacuating the register, etc.

Until the first shift of the sub-transmission 21 is done after the upshift of the manual transmission from second speed to third speed or from third speed to fourth speed, on the basis of the signals generated by said vehicle speed sensor 51, throttle sensor 52, shift position sensor 53, and clutch sensor 54, the said CPU 59 calculates an optimum shift vehicle speed V3H or V4H depending on the throttle opening on the basis of the vehicle speed at that shift time. Herein, V3H is an optimum upshift vehicle speed of the sub-transmission 21 when the manual transmission is in third speed, and V4H is an optimum upshift vehicle speed of the sub-transmission 21 when the manual transmission is in fourth speed. These optimum shift vehicle speeds are determined by the following equations:

$$V3H = f(t, V(23))$$

$$V4H = g(t, V(34))$$

Here t is the throttle opening and f and g are functions of two variables. These V3H and V4H can be obtained by interpolating in a table stored in the predetermined data area of the ROM. V(23) is the vehicle speed at the time when the vehicle is upshifted from second speed to third speed, and V(34) is the vehicle speed at the time when the manual transmission is upshifted from third speed to fourth speed. The optimum upshift vehicle speed is determined by the vehicle speed and the throttle opening at the time of upshift so as to generate the maximum power or the like, and is determined, for example, according to the transmission diagram shown in FIG. 3.

Figure 3:
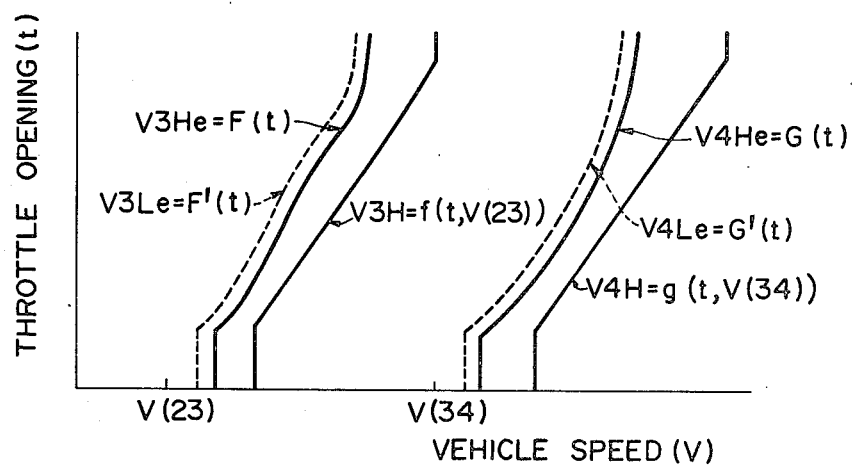
FIG. 3 is a graph, which is a transmission operating diagram of the sub-transmission.

On the other hand, after the first shift of the sub-transmission 21 is done after the upshift of the manual transmission from second speed to third speed or from third speed to fourth speed, the CPU 59 calculates the optimum vehicle shift speeds from the point of view of fuel economy (i.e., optimum fuel economy vehicle shift speeds) V3He, V3Le, or V4He, V4Le, depending on the throttle opening. Here, V3He is the optimum fuel economy vehicle speed for upshift of the sub-transmission 21 when the manual transmission is in third speed, V3Le is the optimum fuel economy vehicle speed for downshift of the sub-transmission 21 when the manual transmission is in third speed, V4He is the optimum fuel economy vehicle speed for upshift of the sub-transmission 21 when the manual transmission is in fourth speed, and V4Le is the optimum fuel economy vehicle speed for downshift of the sub-transmission 21 when the manual transmission is in fourth speed. These optimum fuel economy vehicle speeds are functions F, F', G, G' of throttle opening only, such as V3He=F(t), etc., are not dependent on the vehicle speed at the time of changing the gear ratio of the manual transmission, and are determined, for example, as shown in FIG. 3.

The CPU 59 performs a comparison between the optimum upshift vehicle speed or optimum fuel economy shift vehicle speed, as the case may be, and the real current vehicle speed, as given from the vehicle speed sensor 51, moment by moment, and gives an energization instruction to the solenoid apparatus for the brake 30 through the said common bus 58, output port 67, and a first amplifier 69, when V is greater than or equal to V3H or V3He, or V4H or V4He, as the case may be, and also gives an energization instruction to the solenoid apparatus for the clutch 31 through the said common bus 58, output port 67, and a second amplifier 70, when V is less than V3Le or V4Le as the case may be.

Figure 4:
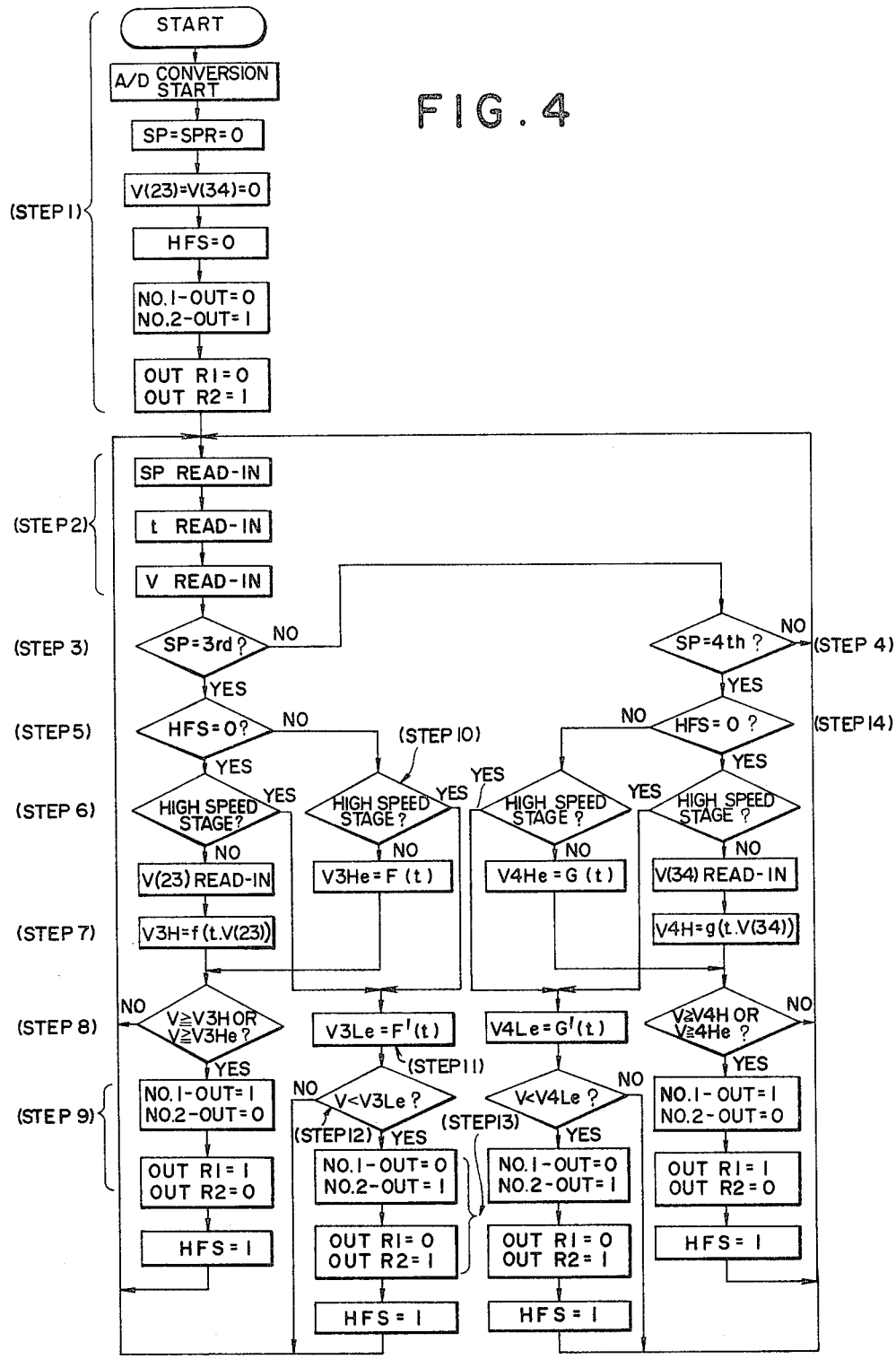
FIG. 4 is a control flow chart of the main routine of the computer.

In the following, the main routine of the computer 50 will be explained by a control flow chart, as shown in FIG. 4. Among the symbols used in the flow chart, SP is the gear of the manual transmission which is engaged when the clutch apparatus 2 is coupled, SPR is the gear of the manual transmission 2 when the clutch apparatus is decoupled, No. 1-OUT is the output signal for the solenoid apparatus for the brake 30, and No. 2-OUT is the output signal for the solenoid apparatus for clutch 31. Further, HFS is a piece of information stored for judging whether the optimum transmission diagram should be used or the optimum fuel economy transmission diagram should be used.

[Step 1]

This step is an initiation step, when the power source is connected to the computer 50. At this time, No. 1-OUT is set to "0" and No. 2-OUT is set to "1", in order to set the sub-transmission 21 in the low speed stage.

[Step 2]

In this step, the transmission stage SP of the manual transmission, the throttle opening t, and the vehicle speed V, at the time when the clutch apparatus 2 is engaged, are loaded in the general register in CPU 59.

[Step 3 and Step 4]

In these steps the discrimination between the third stage and the fourth stage of the manual transmission is done. In this embodiment, when the manual transmission is not in third or fourth speed, shift control of the sub-transmission 21 is not performed, so that control returns to [Step 2].

[Step 5]

This step discriminates whether HFS is "0" or "1". HFS is cleared at the time of the initiation processing, and when V(23) and V(34) are read in. When HFS=0, the sub-transmission is controlled in accordance with the optimum upshift diagram determined by the vehicle speed at the shift time of the manual transmission. After the first shift control of the sub-transmission is done in accordance with this optimum upshift diagram, during the new stage of the manual transmission, HFS becomes "1". On the other hand, when HFS=1, the sub-transmission is controlled in accordance with the optimum fuel economy transmission diagram. Therefore, this step is a discrimination routine for discriminating whether the shift control of the sub-transmission should be done in accordance with the optimum upshift diagram or in accordance with the optimum fuel economy shift diagram.

[Step 6]

This step discriminates whether the sub-transmission 21 is in the low speed stage or in the high speed stage, according to the data OUTR1, OUTR2 stored in RAM of the memory apparatus 65.

[Step 7]

This step is performed in the case that the sub-transmission 21 is in the low speed stage. In this step, the optimum upshift vehicle speed V3H for third speed is calculated with the aid of V(23) given and stored by the interrupt routine INT-2, and the newest value of the throttle opening t read in during [Step 2].

[Step 8]

In this step, a comparison between said optimum upshift vehicle speed V3H obtained in [Step 6] and the actual current real vehicle speed V read in during [Step 2] is performed, and the sub-transmission 21 is shifted to its high speed stage when V is greater than or equal to V3H. On the other hand, when V is less than V3H, the sub-transmission 21 may stay in its low speed stage, so that control is returned to [Step 2].

[Step 9]

This step is an output routine for shifting said sub-transmission 21 to its high speed stage, and generates an electrical signal for shifting said sub-transmission 21 to its high speed stage as its output signal, and stores the same information as this output signal in the predetermined addresses OUTR1, OUTR2 of RAM in the memory apparatus 65.

HFS is set and maintained until the next transmission shift of the manual transmission is done, and the necessity for calculating the optimum upshift vehicle speed V3H occurs.

[Step 10]

This step is performed when the sub-transmission 21 is shifted in accordance with the optimum fuel economy transmission diagram. If the sub-transmission 21 is in its low speed stage at the current time, the optimum fuel economy upshift vehicle speed V3He is calculated, and control is advanced to [Step 8]. In this case, a comparison between said optimum fuel economy upshift vehicle speed V3He and the actual current vehicle speed V is performed in [Step 8]. When V is greater than or equal to V3He, the sub-transmission 21 is shifted to its high speed stage, while when V is less than V3He the sub-transmission 21 may remain in its low speed stage, so that control is returned to [Step 2].

[Step 11]

This step is performed if the sub-transmission 21 is in its high speed stage at the moment. In this case, the optimum downshift vehicle speed V3Le (for third speed) is calculated.

[Step 12]

In this step, a comparison between said optimum downshift vehicle speed V3Le obtained in [Step 11] and the actual current real vehicle speed V is performed, and the sub-transmission 21 is shifted to its low speed stage if V is less than V3Le, while on the other hand if V is not less than V3Le the sub-transmission 21 may remain in its high speed stage, so that control is returned to [Step 2].

[Step 13]

This step is an output routine for shifting said sub-transmission 21 to its low speed stage, and generates an electrical signal for shifting said sub-transmission 21 to its low speed stage as its output signal. If the sub-transmission 21 is in its high speed stage, HFS ought already to have been set at "1", in principle. However, HFS is again set to "1", to guard against errors.

In said [Step 4], if the transmission stage of the manual transmission is fourth gear, control jumps from [Step 4] to [Step 14]. The steps after [Step 14] are similar to the steps after the abovementioned [Step 5].

Figure 5:
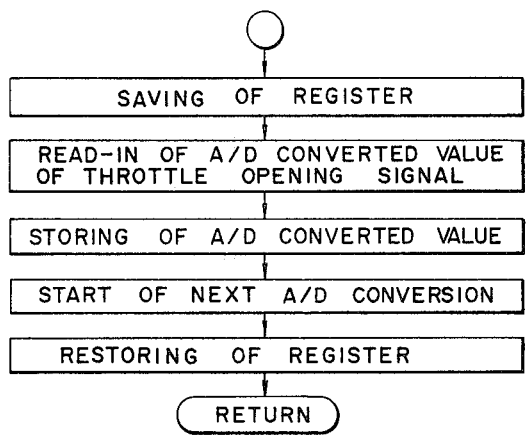
FIG. 5 is a control flow chart of an interrupt routine. INT-0.

In the following, an interrupt routine INT-0 for a first preferential interruption will be explained by a control flow chart shown in FIG. 5. The interrupt routine INT-0 is utilized for converting the input signal from the throttle opening sensor 52, which is an electrical signal proportional to the throttle opening, to a digital signal by the A/D converter 60. A conversion start signal for the A/D converter 60 is given by this routine, excepting that the first conversion start signal is given in the initiation step of the abovementioned main routine.

When the A/D converter 60 receives the conversion start signal from the CPU 59 through the input/output port 62, the A/D conversion is started. After a time determined previously by the A/D converter 60, a conversion end signal, namely the EOC signal, is generated. This signal is given to the CPU 59, as the interrupt requirement signal for INT-0. Once the CPU 59 receives this interrupt requirement signal, the program counter is transferred to the top number of the location area of the processing routine INT-0 automatically. At this time, the contents, which are necessary for the next processing and stored in the general register of CPU 59, are transferred to the random access memory of the memory apparatus 65 temporarily, and are written in therein. Namely, the general register is saved. After that, the A/D converted value is given from the input port 61 to the CPU 59 through the common bus 58, and is written in in the predetermined address of the access memory in the memory apparatus 65. After this, the next A-D conversion start signal is generated by the CPU 59, and the contents of the general register, which have been stored in the random access memory, are restored from the memory to the general register of the CPU 59. After that, a return instruction is generated by CPU 59, whereby the program counter returns to the address implemented directly before the interruption.

Further, in the case that high speed read in of the A/D converted value is unnecessary, a predetermined clock pulse may be used as the interrupt requirement signal instead of the EOC signal.

Figure 6:
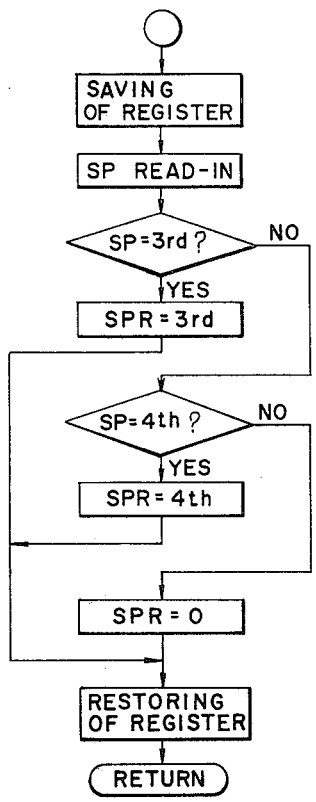
FIG. 6 is a control flow chart of an interrupt routine, INT-1.

Next an interrupt routine INT-1 for a second preferential interruption will be explained by a control flow chart shown in FIG. 6 and a control time chart shown in FIG. 8. The interrupt routine INT-1 is started by the interrupt requirement signal, which is generated by the interrupt requirement signal generator 63 in accordance with the signal generated by the clutch sensor 54 when the clutch 2 is decoupled, as shown in the control time chart of FIG. 8. When the interrupt requirement signal for INT-1 enters in the CPU 59, the CPU 59 starts to implement this interrupt routine INT-1 in a manner similar to the abovementioned interrupt routine INT-0. However, while CPU 59 is performing the interrupt routine INT-0, the implementation of the interrupt routine INT-1 stands by until the completion thereof.

CPU 59 saves the contents of the general register, then receives the transmission stage signal of the manual transmission from the input/output port 62 through the common bus 58, and stores this signal in the predetermined address in the random access memory of the memory apparatus 65. The input/output port 62, on the basis of signals received from the switch for detecting third speed, 53t, and the switch for detecting fourth speed, 53f, is able to detect the transmission stage of the manual transmission (but is of course not able to detect the difference between first, second, reverse, and neutral gears). The CPU 59 receives this detected result and writes SPR=3 when the detected transmission stage is third speed, SPR=4 when it is fourth speed, or SPR=0 when it is other than third speed or fourth speed, in the memory apparatus 65. After this, CPU 59 restores the contents of the general register and then generates the return instruction.

Figure 7:
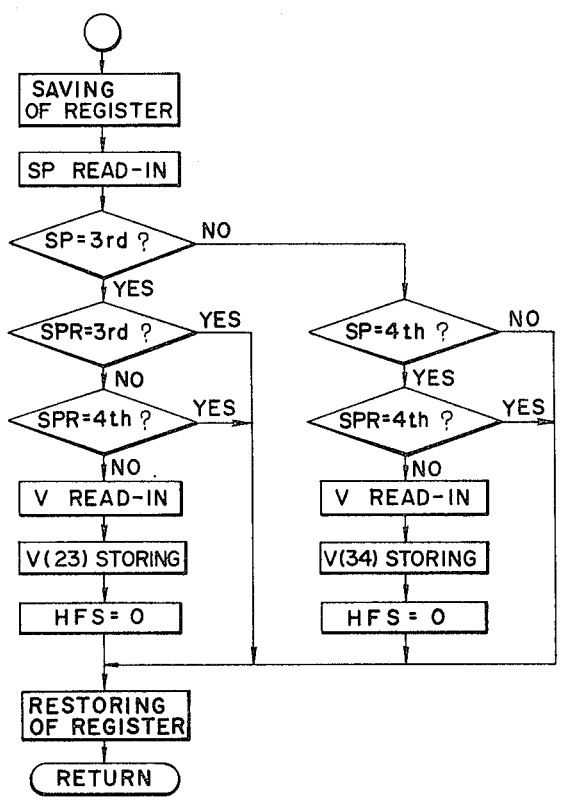
FIG. 7 is a control flow chart of an interrupt routine, INT-2.

Next, an interrupt routine INT-2 for a third preferential interruption will be explained by a control flow chart shown in FIG. 7 and a control time chart shown in FIG. 8. This interrupt routine INT-2 is started by the interrupt requirement signal for INT-2, which is generated by the interrupt requirement signal generator 63 in accordance with the output signal of the clutch sensor 54 when the clutch apparatus 2 is coupled, as shown in FIG. 8.

This routine begins by reading in SP. When the transmission stage of the manual transmission after the clutch operation is other than third speed or fourth speed, this routine does nothing and returns to its start point. In the case that the transmission stage of the manual transmission after the clutch operation is the third speed, when the previous transmission stage of the manual transmission, namely SPR stored in the memory apparatus by the abovementioned interrupt routine INT-1, is the third speed or the fourth speed, the shift is regarded as being a downshift, and this routine does nothing and returns to its start point. In a case other than this, the shift is regarded as an upshift from second speed, and the vehicle speed V at that time is given to CPU 59, so that the vehicle speed V(23) at the time of the upshift to third speed is stored in the predetermined vehicle speed memory address of the random access memory in the memory apparatus 65. Then HFS is cleared to "0" and a return instruction is generated. And, in the case that the transmission stage of the manual transmission after the clutch operation is fourth speed, when SPR is fourth speed, the shift is not an upshift, so that this routine does nothing, and returns to the start point. In any case other than this, the shift is regarded as an upshift, and the vehicle speed V(34) at the time of the upshift to the fourth speed is stored in the predetermined vehicle speed memory address of the random access memory in the memory apparatus 65. Then HFS is cleared to "0" and a return instruction is generated.

In the abovementioned embodiment, when the transmission stage of the manual transmission becomes third speed or fourth speed by the upshift operation, the transmission point of the sub-transmission is calculated as the vehicle speed depending on the throttle opening in dependence on the vehicle speed at the time of that upshift, and the shift control signal from the low speed stage to the high speed stage or from the high speed stage to the low speed stage is given to the sub-transmission on the basis of the comparison between that vehicle speed and the real vehicle speed. As the transmission point of the sub-transmission is determined on the basis of the vehicle speed at the time of the upshift of the manual transmission, the sub-transmission can be shifted so as to continue the operating performance which is desired by the driver, and is determined on the basis of the shifting of the manual transmission by hand by the driver. Further, after the first shift of the sub-transmission from the low speed stage to the high speed stage is done on the basis of the abovementioned vehicle speed, the transmission point is then determined from the aspect of obtaining optimum fuel economy, unless and until the next transmission shift of the manual transmission is performed. Therefore, after the first shift of the sub-transmission is performed in a certain manual transmission shift stage, the sub-transmission is thereafter shifted so as to minimize the fuel consumption, as long as the manual transmission remains in that speed stage; so that the fuel consumption of the vehicle is improved.

The above described shift control of the sub-transmission may be done, if necessary, in all forward transmission stages of the manual transmission, and also in the transmission stages set by downshifting. Such modifications will be easy for one skilled in the art, based upon the foregoing disclosure, and the disclosure of the above-identified copending patent application, which is to be considered as incorporated herein.

The transmission diagram of the sub-transmission shown in FIG. 3 may vary in its slope and shape in dependence on the vehicle speed at the time of the transmission shift of the manual transmission. Furthermore, the abovementioned control may be performed by using an engine speed signal generated from an engine speed sensor 71 shown in FIG. 2, instead of a vehicle speed signal, and by using a signal generated from an inlet manifold vaccum sensor 72 shown in FIG. 2, instead of a throttle opening signal.

Instead of the above described embodiment, in which the changing over of the performance of shifting the sub-transmission is performed to a shifting according to the optimum fuel economy transmission diagram at the time point when the first sub-transmission shift is done, this time point may be determined as being a certain predetermined time interval after the transmission shift time of the manual transmission. In this case, a timer circuit may be provided, instead of the use of the quantity HFS in the CPU program, and the signal generated by said timer circuit may be used to trigger the start of sub-transmission shifting according to the optimum fuel economy diagram. Such a modification is quite within the scope of the present invention, and its details will be obvious to one skilled in the art, based upon the foregoing disclosure.

Although the invention has been shown and described in terms of a preferred embodiment thereof, it should be understood that various changes, modifications, and omissions of the form and the detail of any particular embodiment may be made by one skilled in the art, without departing from the principles of the present invention, or from its scope or spirit. Therefore it is desired that the protection afforded by Letters Patent should not be in any way limited by any details of the shown embodiment, or of the drawings, but solely by the appended claims.

We claim:

1. A shift control method for a sub-transmission of a vehicle which is also equipped with a manual transmission operated by a driver, said method comprising the steps, in order, of:

detecting said driver's shifting of said manual transmission at a certain gearing ratio;

measuring a value of a parameter related to vehicle speed and a value for throttle opening at said driver's shift point of the manual transmission set to said certain gearing ratio;

determining, on the basis of said certain gear ratio and of said measured parameter values, a driver-determined sub-transmission shift line for said gearing ratio of the manual transmission, said shift line indicating the relationship between said parameter related to the vehicle speed and said throttle opening when said sub-transmission is to be shifted;

performing, for a first time period, shift control of the sub-transmission in accordance with said driver-determined sub-transmission shift line, while the manual transmission is set to said gearing ratio;

and performing, for a second time period which directly follows the first time period, shift control of the sub-transmission in accordance with a standard prdetermined shift line, said standard predetermined shift line providing a relationship between vehicle speed and throttle opening along which said sub-transmission is shifted to provide substantially optimum fuel economy, said shift control for a second period being performed while the manual transmission is set to said gearing ratio.

2. The method of claim 1, wherein the step of performing shift control during the second time period takes place at the first shifting operation of the sub-transmission following a shift of said manual transmission.

3. The method of claim 1, wherein the step of performing the shift control during the second time period is after the lapse of a predetermined time from the instant of a shift of said manual transmission.

4. The method of claim 1, 2 or 3 wherein said parameter related to vehicle speed is vehicle speed.

5. The method of claim 1, 2 or 3 wherein said parameter related to vehicle speed is engine speed.

6. The method of claim 1, 2, or 3 wherein the vehicle is equipped with a clutch, and wherein said driver's shifting is detected by detecting the operation of said clutch.

7. The method of claim 6, wherein the disengagement of said clutch is detected to initiate a process of determining the shift state of the manual transmission before shifting, and re-engagement of said clutch is detected to initiate the step of determining the transmission shift procedure.

8. The method of claim 1 wherein the steps of determination of said sub-transmission shift line and subsequently performing shift control of said sub-transmission in accordance with the shift line are performed by a computer.

* * * * *